April 6, 1926.　　　　L. G. BAYRER　　　　1,580,097
DIE SINKING MACHINE
Filed Oct. 28, 1922　　　2 Sheets-Sheet 1
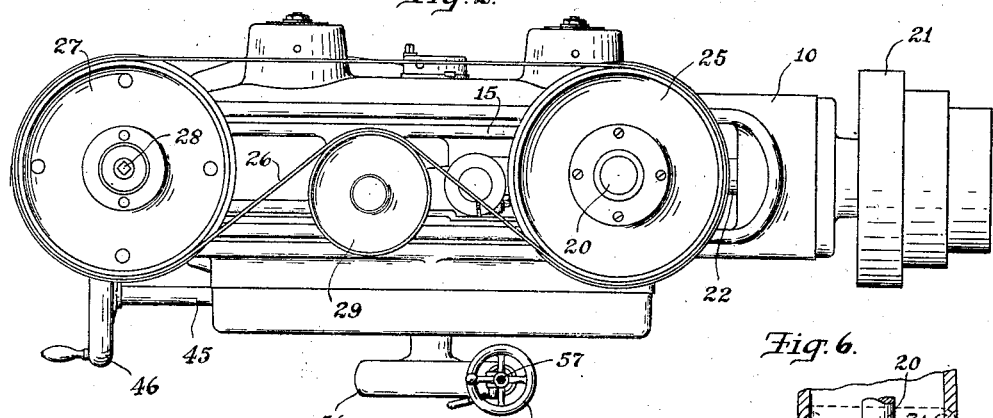
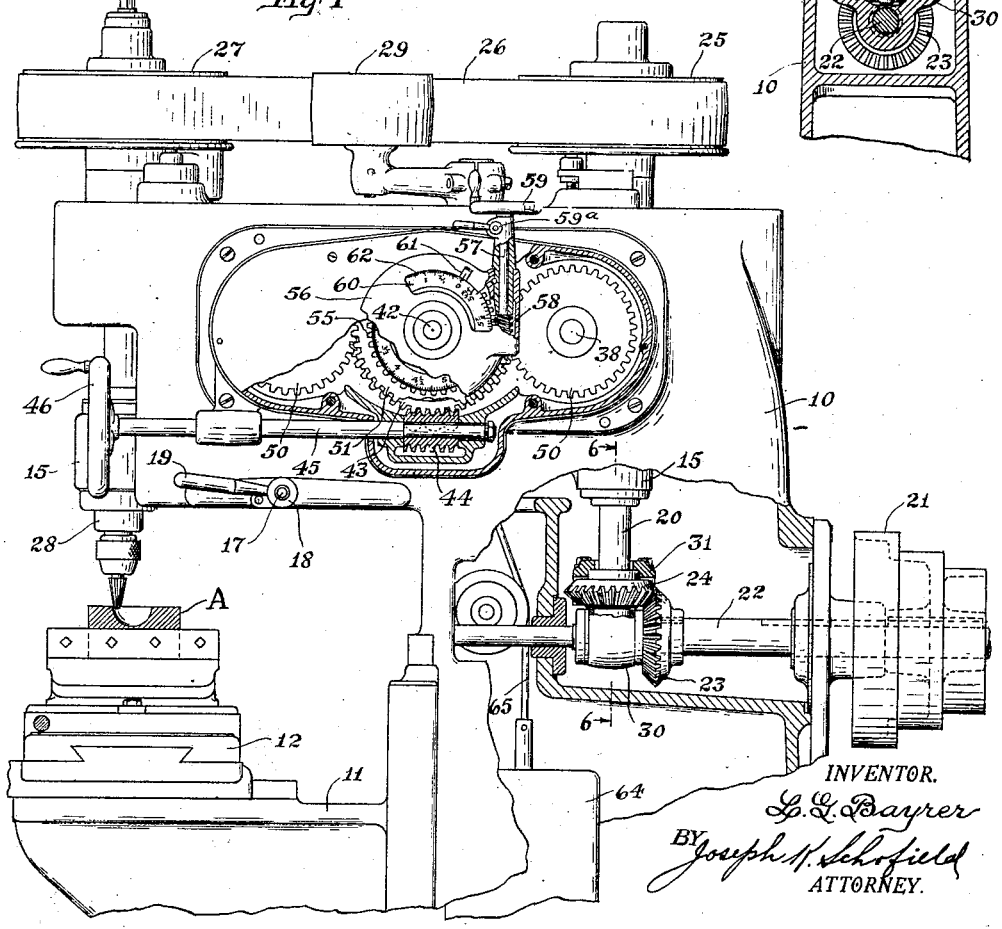
INVENTOR.
L. G. Bayrer
BY Joseph K. Schofield
ATTORNEY.

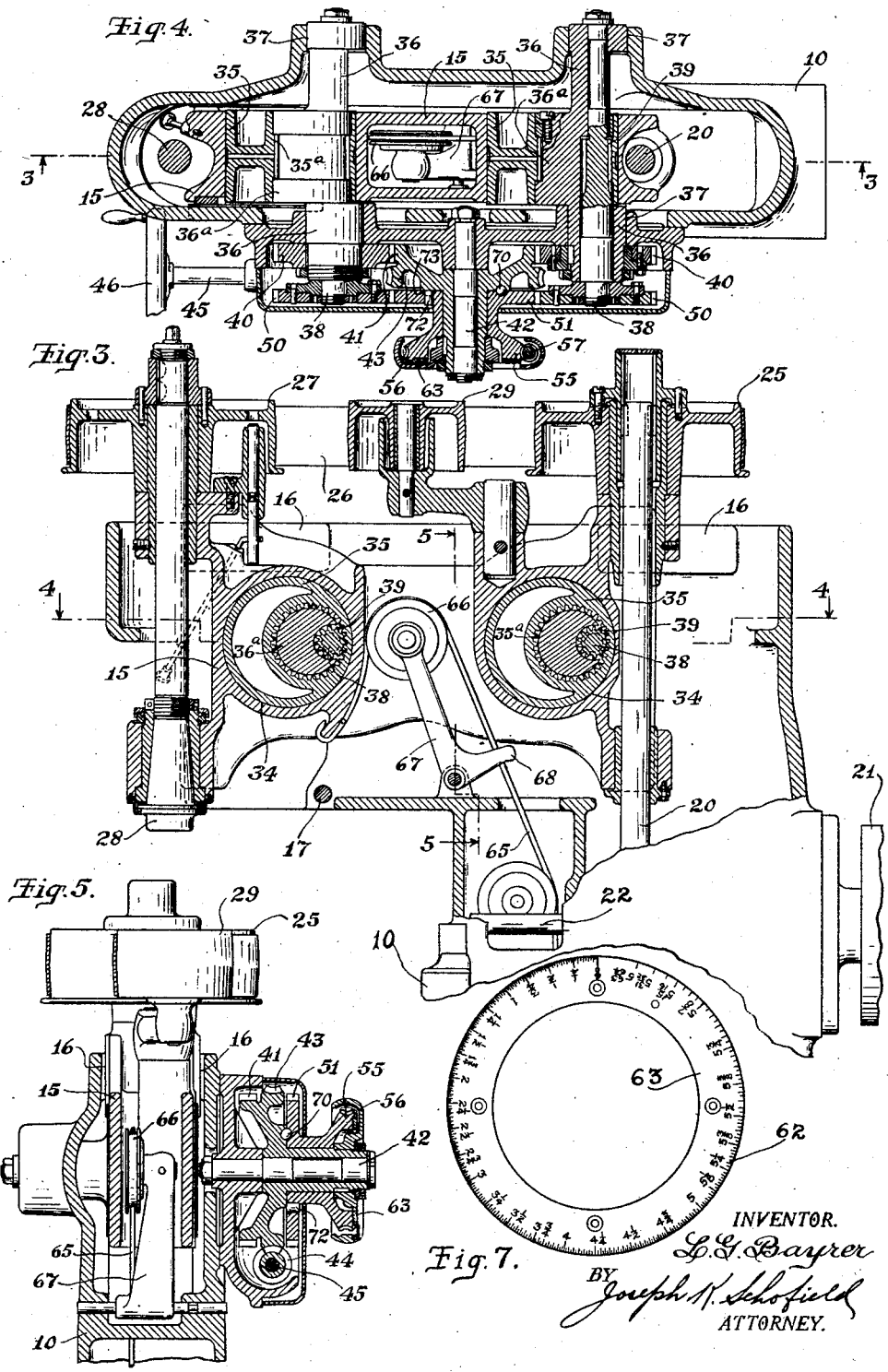

Patented Apr. 6, 1926.

1,580,097

UNITED STATES PATENT OFFICE.

LOUIS G. BAYRER, OF BUFFALO, NEW YORK.

DIE-SINKING MACHINE.

Application filed October 28, 1922. Serial No. 597,614.

*To all whom it may concern:*

Be it known that I, LOUIS G. BAYRER, a citizen of the United States, residing at Buffalo, in the county of Erie and State of New York, have invented certain new and useful Improvements in Die-Sinking Machines, of which the following is a specification.

This invention relates to die sinking machines and particularly to one having a cherrying attachment which may be adjusted to operate on arcs of various diameters.

An object of the present invention is to provide an improved construction generally similar to that disclosed in my Patent No. 1,354,942 granted October 5, 1920.

One feature which is advantageous is that I provide all of the operating mechanism for varying the bodily movements and adjustments of the tool spindle carriage within a closed housing and mount the controlling mechanisms for this carriage all at one side of the carriage.

Another feature which is advantageous is that the control mechanism for this carriage is more conveniently arranged for operation by the workman, and the means for adjusting the throw of the eccentrics and the spindle carriage is adapted to be more rapidly adjusted and its adjustment locked to prevent accidental displacement. Also this adjustment may be accurately determined by an improved form of graduated dial.

Another object of the invention is to provide means for locking the tool spindle carriage securely and rigidly in any position so that the machine may be used as a standard vertical milling machine.

A still further object of the invention is to provide improved driving means for the tool spindle so that the bodily movements of the carriage will not effect the continuous rotation of the spindle.

Another important object of the invention is to provide worm and wheel mechanisms for bodily moving the carriage and also for varying its radius of operation so that these means may be accurately and conveniently controlled.

With these and other objects in view, my invention consists in the features of construction and operation set forth in the following specification and illustrated in the accompanying drawings.

In the accompanying drawings annexed hereto and forming a part of this specification, I have shown my invention embodied in a die sinking machine but it will be understood that the invention can be otherwise embodied and that the drawings are not to be construed as defining or limiting the scope of the invention, the claims appended hereto being relied upon for that purpose.

In the drawings:

Figure 1 is a side elevation of a die sinking machine, parts being broken away to more clearly disclose the present invention.

Fig. 2 is a plan view of the machine.

Fig. 3 is a central sectional view of the machine taken on line 3—3 of Fig. 4.

Fig. 4 is a horizontal sectional view taken on line 4—4 of Fig. 3.

Fig. 5 is a front view in section showing the controlling mechanism for the spindle carrying carriage.

Fig. 6 is a detail view of the driving means for the spindle, and

Fig. 7 is a detail view of my improved dial.

In the above mentioned drawings, I have shown but one modification of the invention which is now deemed preferable but it is to be understood that changes and modifications may be made within the scope of the appended claims without departing from the spirit of the invention.

Briefly, my invention in its broadest aspect comprises the following principal parts: first, a frame; second, a centrally mounted carriage or head having a tool spindle mounted vertically near one end; third, compound eccentrics comprising inner and outer eccentrics engaging the tool carriage or head and having the shafts on which the inner eccentrics are fixed mounted in the frame; fourth, worm and wheel means for simultaneously varying the throw of these eccentrics; fifth, worm and wheel means for simultaneously rotating the outer eccentrics relative to the inner eccentrics in any position of adjustment; sixth, means to indicate the adjustment or throw for which the compound eccentrics are adjusted, all of these means for controlling the position and throw of the spindle carrying carriage or head being mounted upon one side of the frame; seventh, improved means for driving the spindle; and eighth, means for counterbalancing the weight of the carriage or head.

Referring more in detail to the figures of the drawings, I provide a frame 10 similar in general outline to that disclosed in the above mentioned patent. This frame 10 is provided with an adjustable knee 11 on which is a movable carriage 12 of usual form. On this carriage 12, work A of any description may be adjustably secured and its vertical or horizontal position varied within the capacity of the machine by movement of the knee 11 or carriage 12. Centrally mounted within the upper portion of the frame is a spindle carrying carriage or head 15, the adjusting and controlling means for which comprise the particular object of the present invention.

On opposite sides of the spindle carrying carriage 15 are guiding surfaces 16 with which the side walls of the frame 10 which form guideways for the carriage 15 may slidably contact. In this way, the spindle head 15 may be readily moved between portions of the frame 10 in accordance with movements of the controlling mechanism presently to be described. In order to secure the head 15 in fixed position so that the machine may be used for vertical milling operations a bolt 17 is provided extending through the frame 10 from side to side and having a clamping nut 18 on one side. By means of the short arm or lever 19 extending from this nut 18, the bolt 17 may be tightened thus tightening the sides of the frame 10 against the carriage 15 whereby the head is securely clamped.

Vertically extending through this carriage 15 near one end is a vertical driving shaft 20 adapted to be connected with the driving pulley 21 and main driving shaft 22 of the machine through the bevel gears 23 and 24 shown. Near the upper end of this vertical shaft 20 is a driving pulley 25 adapted to be placed in driving connection by means of a belt 26 with a pulley 27 mounted on the upper end of the tool spindle 28. For convenience, an idler pulley 29 is interposed between these two pulleys 25 and 27 in order to maintain constant tension in the driving belt 26. As seen in Fig. 1, the bevel gear 23 on the main driving shaft 22 is keyed thereto and the shaft 22 splined to the driving pulley 21 so that this bevel gear 23 together with the bevel gear 24 on the vertical shaft 20 and the main shaft 22 may be laterally movable. As shown in Figs. 1 and 6, the bevel gear 23 on the main driving shaft 22 is maintained in mesh with its mating bevel gear 24 by the member 30 within which the bevel gear 24 is rotatably mounted, the bevel gear 23 being held adjacent the member 30 by the collars shown. As the spindle carriage 15 has a vertical movement as well as a horizontal one, the pulley 25 at the upper end of the vertical shaft 20 is splined to its shaft in order that the vertical shaft 20 may slide through its rotating member about which the pulley 25 is mounted in accordance with the movement of the carriage. Preferably, and as shown, the member 30 is in the form of a yoke surrounding the shaft 22 and enclosing the bevel gear 24. It also surrounds the shaft 20. The member 30 is preferably provided with a plate or cover 31 so that the parts may be conveniently assembled. Ball bearings 33 mounted within the member provide convenient rotatable and thrust bearings for the lower end of the shaft 20.

Extending transversely through the spindle carriage 15 are two spaced circular openings 34 in which the outer eccentrics 35 of ring form may rotate. These eccentrics are mounted on shafts 36 provided with eccentrics 36$^a$ preferably formed integrally therewith and extend through suitable bearings 37 in the frame 10 of the machine. As shown, means are provided for varying the throw of these outer eccentrics 35 relative to the eccentrics 36$^a$ on shafts 36 by relative rotation of the eccentric rings 35 about shafts 36. As these means, however, are substantially identical with the means disclosed in the above mentioned patent, further description thereof is not thought to be necessary. It will be sufficient to state that by rotating the shafts 38 and pinions 39 provided within the eccentrics on shaft 36, relative to the eccentric rings 35, the effective throw of the eccentric rings 35 may be materially varied, and, as both of these eccentric rings 35 are adapted to be adjusted simultaneously and equally, it will be seen that the bodily movement given to the tool spindle carriage or head 15, which is always of arcuate form, may be restricted to any radius less than a radius equal to the maximum throw of the eccentrics 35 about the axis of shafts 36. As shown in Figs. 3 and 4, the pinions 39 engage teeth 35$^a$ provided on an internal surface of the eccentric rings 35.

In order to rotate the eccentric rings 35 and eccentric shafts 36 rigidly together after they have been adjusted for the desired throw, gears 40 are keyed directly to the eccentric shafts 36, both of these gears 40 being in mesh with a central gear 41 mounted on and rotating upon a fixed stud 42 outstanding horizontally from the frame 10. Adjacent this central gear 41 is a worm wheel 43 preferably formed integrally therewith and meshing with this worm wheel 43 is a worm 44 on a shaft 45 extending forwardly. On the forward end of this shaft 45 is a hand wheel 46 by means of which the central gear 41 and therefore the eccentric rings 35 and eccentric shafts 36 may be rotated through arcs of any angle or about complete circles for which they are adjusted.

On the ends of the pinion shafts 38 for adjusting the throw of the eccentric rings 35 in relation with the throw of eccentric shafts 36 are provided gears 50 keyed or otherwise fastened thereto and in mesh with these gears is a central gear 51 rotatable upon a sleeve extension of the central gear 41 above mentioned. The gears 50 upon the pinion shafts 38 and also those on the eccentric shafts 36 are all equal to each other, and the central gears 41 and 51 with which they respectively mesh are also equal.

It will be seen from the above that by varying the relative angular positions of the two central gears 41 and 51 upon the stud 42 outstanding from the frame 10 that the throw of the eccentric rings 35 relative to the axis of shafts 36 will be simultaneously varied. In order to accomplish this adjustment readily and accurately, I provide a worm wheel 55 formed integrally or keyed to the central gear 51 in mesh with the gears 50 on the pinion shafts 38, and also provide a housing 56 keyed upon the end of the sleeve carrying the worm wheel 43 and gear 41 in mesh with the gear 40 keyed direct to eccentric shafts 36. In this housing 56 I mount a small shaft 57 carrying a worm 58 in mesh with the worm wheel 55. A hand wheel 59 is provided on this worm shaft 57 by means of which the adjustment of the worm wheel 55 relative to the housing 56 may take place. I also provide locking means in the form of a clamping screw 59$^a$ for securely clamping the worm shaft 57 in any adjusted position to maintain any adjustment for which the eccentric rings 35 are set.

Preferably the housing 56 is provided with an arcuate opening 60 and a zero line 61 adjacent graduations 62 is provided on the forward face of the worm wheel 55 so that the operator may at all times know the adjustment for which the rings 35 are set relative to shafts 36 and thus may know the radius of bodily movement of the spindle carriage or head 15.

The graduations 62 are preferably provided in a separate plate 63 which may be permanently fastened on the forward face of the worm wheel 55. Preferably, also the graduations extend throughout the entire circumference of this plate as indicated in Fig. 1. In order to accomplish this the ratio of the gears 39, 35, 50 and 51 is such that one complete revolution of gear 51 relative to the gear 41 and the housing 56 varies the diameter of the arc through which the spindle moves from zero to its maximum. It will be obvious, however, that the graduations cannot be uniformly distributed over the plate 63 for the reason that varying the relative angular positions of the eccentrics 35 and 35$^a$ does not uniformly vary the stroke. I, therefore, graduate this plate 63 with indicia accurately disposed to indicate uniform increments of radii through which the spindle 28 may operate.

It will be seen that unless means are interposed to limit the rotation of the gears 41 and 51 to one complete turn, continued rotation of the gears would cause the graduations 62 to falsely indicate the stroke for which the eccentrics 35 and 35$^a$ are set. I therefore interpose a ball 70 adjacent the hub of worm gear 43 and permit it to enter a peripheral groove 73 in the gear 51. A pin 72 in gear 51 is adapted to strike the ball 70 so that it will limit the rotation of the two gear members 41 and 51. Preferably the slot in gear 43 for the ball 70 is long enough to compensate for the diameter of the ball 70 and thickness of pin 72.

From the above it will be seen that all adjustments are made upon one side of the frame 10 and carriage 15 only and that all of the controlling mechanism for movements of the carriage 15 and for adjusting its radius of movement are on but one side of the carriage thus facilitating the assembling of the parts and simplifying the mechanism.

As the spindle carriage 15 is movable vertically, it is desirable that a counterweight 64 be provided. The horizontal component of the carriage movement however prevents the usual form of attachment. For this reason, the cable 65 to which the weight 64 is attached passes over an idler 66 at the free end of a vertically swinging arm 67 and is attached to the carriage at one of its forward portions. It will thus be seen that the arm 67 carrying the idler pulley 66 may swing back and forth in accordance with the horizontal movements of the carriage without effecting the counterbalancing effect of the weight 64. A lateral projection 68 on the arm 67 limits the swinging movement of this arm in one direction.

Referring to Fig. 7, the varying spacings of the graduations 62 on plate 63 will be clear. They are laid out accurately to indicate the combined eccentricity of the two eccentrics 35 and 36 when in different angular positions relative to each other. It is obvious that the combined eccentricity of these eccentrics, which represents the radius of movement of the head 15, will vary more rapidly while the eccentrics are being turned through some portions of their circular movement than through other portions. The eccentricity of the compound eccentrics and therefore the throw of the tool head 15 vary most rapidly while the eccentrics are disposed in the angular positions for short throws of the tool head 15. This is indicated by the closeness of the graduations for different small throws of the tool head. Similarly the throw, or radius of movement, of the tool head when the eccentrics are set for approximately their maximum throws have the graduations on the plate very widely spaced.

With the graduations 62 applied to the plate 63 in this manner so that they vary in spacings but each graduation indicates a particular arc of movement rather than the particular angular disposition of the two members forming the compound eccentric, an operator is enabled to determine at sight exactly what radius of movement for which the eccentrics are set. On the other hand, with equal spacings of graduations, tables would have to be consulted to obtain the throw of the tool head corresponding to each particular setting of the eccentrics; or, another and more complicated mechanism would be required to enable equal spacings to be used to indicate equal differences in the throw of the tool head.

What I claim is:

1. A die sinking machine comprising in combination, a frame, a head mounted therein, a rotatable cutter carrying spindle mounted in said head, means for bodily moving said head in a closed path while the spindle is maintained always parallel in the plane of the closed path, means to vary the radius of movement of said head, said means to move said head and to vary its radius of movement being mounted upon one side of the head and frame, and means to indicate the adjustment for which the head is set.

2. A die sinking machine comprising in combination, a frame, a head mounted therein, a rotatable cutter carrying spindle mounted in said head, means for bodily moving said head in a closed path while the spindle is maintained always parallel in the plane of the closed path, adjusting means to vary the radius of movement of said head, said means to move said head and to vary its radius of movement being mounted upon one side of the head and frame, and means to lock the adjusting means in any desired adjustment.

3. A die sinking machine comprising in combination, a frame, a head mounted therein, a rotatable cutter carrying spindle mounted in said head, means for bodily moving said head in a closed path while the spindle is maintained always parallel in the plane of the closed path, adjusting means to vary the radius of movement of said head, said means to move said head and to vary its radius of movement being mounted upon one side of the head and frame, means to lock the adjusting means in any desired adjustment, and means to indicate the adjustment for which the head is set.

4. A die sinking machine comprising in combination, a frame, a head mounted therein, a rotatable cutter carrying spindle mounted in said head, means for bodily moving said head in a closed path while the spindle is maintained always parallel in the plane of the closed path, and worm and worm wheel means for varying the radius of movement of said head, said means to move said head and to vary its radius of movement being mounted on one side of the head and frame.

5. A die sinking machine comprising in combination, a frame, a head mounted therein, a rotatable cutter carrying spindle mounted in said head, means for bodily moving said head in a closed path while the spindle is maintained always parallel in the plane of the closed path, worm and worm wheel means for varying the radius of movement of said head, said means to move said head and to vary its radius of movement being mounted on one side of the head and frame, and means to indicate the adjustment for which the head is set.

6. A die sinking machine comprising in combination, a frame, a head mounted therein, a rotatable cutter carrying spindle mounted in said head, means for bodily moving said head in a closed path while the spindle is maintained always parallel in the plane of the closed path, worm and worm wheel means for varying the radius of movement of said head, and means to lock the adjusting means in any desired adjustment, said means to move said head and to vary its radius of movement being mounted on one side of the head and frame.

7. A die sinking machine comprising in combination, a frame, a head mounted therein, a rotatable cutter carrying spindle mounted in said head, means for bodily moving said head in a closed path, while the spindle is maintained always parallel in the plane of the closed path, worm and worm wheel means for varying the radius of movement of said head, means to lock the adjusting means in any desired adjustment, said means to move said head and to vary its radius of movement being mounted on one side of the head and frame, and means to indicate the adjustment for which the head is set.

8. A die sinking machine comprising in combination, a frame, a head mounted therein, a rotatable cutter carrying spindle mounted in said head, a worm and worm wheel means for bodily moving said head in a closed path while the spindle is maintained always parallel in the plane of the closed path, and worm and worm wheel means to vary the radius of movement of said head, said means to move said head and to vary its radius of movement being mounted on one side of the head and frame.

9. A die sinking machine comprising in combination, a frame, a head mounted therein, a rotatable cutter carrying spindle mounted in said head, worm and worm wheel means for bodily moving said head in a closed path while the spindle is maintained always parallel in the plane of the closed path, worm and worm wheel means to vary the radius of movement of said head, said means to move said head and to vary its radius of movement being mounted on one side of the head and frame, and means to indicate the adjustments for which the head is set.

10. A die sinking machine comprising in combination a frame, a head mounted therein, a rotatable cutter carrying spindle mounted in said head, a worm and worm wheel, means for bodily moving said head in a closed path while the spindle is maintained always parallel in the plane of the closed path, worm and worm wheel means to vary the radius of movement of said head, and means to lock the adjusting means in any desired adjustment, said means to move said head and to vary its radius of movement being mounted on one side of the head and frame.

11. A die sinking machine comprising in combination, a frame, a head mounted therein, a rotatable cutter carrying spindle mounted in said head, a worm and worm wheel, means for bodily moving said head in a closed path while the spindle is maintained always parallel in the plane of the closed path, worm and worm wheel means to vary the radius of movement of said head, means to lock the adjusting means in any desired adjustment, said means to move said head and to vary its radius of movement being mounted on one side of the head and frame, and means to indicate the adjustments for which the head is set.

12. A die sinking machine comprising in combination, a frame, a head mounted therein, means for bodily moving said head relative to the frame while the spindle is maintained always parallel in the plane of the closed path, and means to lock the head in any position relative to the frame.

13. A die sinking machine comprising in combination, a frame, a head mounted therein, means for bodily moving said head relative to the frame in an arcuate path, a spindle in said head maintained always parallel during the movement of the head, and means to rotate said spindle while said head is being bodily moved, said means including a bevel gear fast to a driving shaft and retained in intermeshing relation with another bevel gear by means of a yoke member surrounding said driving shaft.

14. A die sinking machine comprising in combination, a frame, a head mounted therein, means for bodily moving said head relative to the frame in an arcuate path, a spindle in said head maintained always parallel during the movement of the head, and means to rotate said spindle while said head is being bodily moved, said means including a bevel gear fast to a driving shaft, another bevel gear fixed to a shaft at right angles to said driving shaft, and means surrounding both of said shafts to retain said gears in intermeshing relation.

15. A die sinking machine comprising in combination, a frame, a head mounted therein, means for bodily moving said head relative to the frame in an arcuate path, a spindle in said head maintained always parallel during the movement of the head, and means to rotate said spindle while said head is being bodily moved, said means including a bevel gear fast to a driving shaft, another bevel gear fixed to a shaft at right angles to said driving shaft, and a yoke member surrounding both of said gears and said shafts to retain said gears in intermeshing relation.

16. A die sinking machine comprising in combination, a frame, a head mounted therein, means for bodily moving said head relative to the frame in an arcuate path, a spindle in said head maintained always parallel during the movement of the head, means to manually vary the position of the head, and means to rotate said spindle while said head is being bodily moved, said means including a main driving shaft, a driven shaft on said head, bevel gears connecting said shafts, a housing enclosing said gears and retaining them in mesh, and one of said shafts being axially movable with movements in one direction of the head.

17. A die sinking machine comprising in combination, a frame, a head mounted therein, means for bodily moving said head relative to the frame in an arcuate path, a spindle in said head maintained always parallel during the movement of the head, means to manually vary the position of the head, and means to rotate said spindle while said head is being bodily moved, said means including a main driving shaft, a driven shaft on said head, bevel gears connecting said shafts, a housing enclosing said gears and retaining them in mesh, said driving shaft being axially movable with horizontal movements of the head.

18. A die sinking machine comprising in combination, a frame, a head mounted therein, means for bodily moving said head relative to the frame, and counterbalancing means for said head comprising a weight, a cable supporting said weight attached to said head and extending over a vertically swinging arm.

19. A die sinking machine comprising in combination, a frame, a head mounted therein, means for bodily moving said head relative to the frame, counterbalancing means for said head comprising a weight, a cable supporting said weight attached at one end to said head, a swinging arm over which said cable extends, and means to limit the swinging movement of the arm.

20. A die sinking machine comprising in combination, a frame, a head mounted therein, a rotatable cutter carrying spindle mounted in said head, means for bodily moving said head in a closed arcuate path while the spindle is maintained always parallel, means to vary the radius of movement of said head, and means to indicate the radius of movement for which the head is set.

21. A die sinking machine comprising in combination, a frame, a head mounted therein, a rotatable cutter carrying spindle mounted in said head, means for bodily moving said head in a closed arcuate path while the spindle is maintained always parallel, means to vary the radius of movement of said head, and a circular series of graduations to indicate the radius of movement for which the head is set.

22. A die sinking machine comprising in combination, a frame, a head mounted therein, a rotatable cutter carrying spindle mounted in said head, means for bodily moving said head in a closed arcuate path while the spindle is maintained always parallel, means to vary the radius of movement of said head, and graduations extending completely about a circular disk and so spaced thereon to indicate uniform differences in diameter for which the head is set.

23. A die sinking machine comprising in combination, a frame, a head mounted therein, a rotatable cutter carrying spindle mounted in said head, means for bodily moving said head in a closed arcuate path while the spindle is maintained always parallel, two circular members the angular position of which may be varied to change the radius of operation of the head, and graduations on one of said members so disposed to indicate different radii for which the head is set.

24. A die sinking machine comprising in combination, a frame, a head mounted therein, a rotatable cutter carrying spindle mounted in said head, means for bodily moving said head in a closed arcuate path while the spindle is maintained always parallel, means to vary the radius of movement of said head, and irregularly spaced graduations to indicate the radius of movement for which the means for bodily moving the head are set.

25. A die sinking machine comprising in combination, a frame, a head mounted therein, a rotatable cutter carrying spindle mounted in said head, pairs of compound eccentrics for bodily moving said head in a closed arcuate path while the spindle is maintained always parallel, means to vary the radius of movement of said head, and irregularly spaced graduations to indicate the radius of movement for which the said pairs of compound eccentrics for bodily moving the head are set.

26. A die sinking machine comprising in combination, a frame, a head mounted therein, a rotatable cutter carrying spindle mounted in said head, pairs of compound eccentrics for bodily moving said head in a closed arcuate path while the spindle is maintained always parallel, means to vary the relative angular positions of the members of the compound eccentrics to vary the radius of movement of said head, and graduations on one of the members for bodily moving the head to indicate the radius of movement for which said means are adjusted.

In testimony whereof, I hereto affix my signature.

LOUIS G. BAYRER.